United States Patent
Sogani et al.

(10) Patent No.: US 12,367,070 B1
(45) Date of Patent: Jul. 22, 2025

(54) METHOD FOR MANAGING STORAGE INSTANCES IN A MULTI CLUSTER ENVIRONMENT AND A SYSTEM THEREOF

(71) Applicant: HONEYWELL INTERNATIONAL INC., Charlotte, NC (US)

(72) Inventors: Mahaveer Sogani, Bangalore (IN); Varun Gupta, Bangalore (IN); Aaron Dsouza, Alpharetta, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/642,838

(22) Filed: Apr. 23, 2024

(51) Int. Cl.
- G06F 7/00 (2006.01)
- G06F 9/48 (2006.01)
- G06F 16/25 (2019.01)
- G06F 16/28 (2019.01)
- H04L 67/5683 (2022.01)

(52) U.S. Cl.
CPC .......... *G06F 9/4881* (2013.01); *G06F 16/258* (2019.01); *G06F 16/285* (2019.01); *H04L 67/5683* (2022.05)

(58) Field of Classification Search
CPC .. G06F 9/4881; G06F 16/2365; G06F 16/258; G06F 16/285; H04L 67/5683
USPC .................................................. 707/600–899
See application file for complete search history.

(56) References Cited

U.S. PATENT DOCUMENTS

2012/0246161 A1* 9/2012 Murakami ........... H04N 21/252
707/E17.046

* cited by examiner

*Primary Examiner* — Isaac M Woo

(57) ABSTRACT

The present invention provides a system for orchestrating the storage instances in a multi-cluster environment, said system comprises at least a processor and a memory. The program instructions are stored in the memory which when executed is configured to receive data from one or more devices associated with a user. Upon receiving the data, one or more profile of the user device are accessed and based on the profile data, one or more clusters and one or more databases are identified in a multi-cluster environment. Further, the processor executes a database optimization algorithms to determine one or more parameters of the database and dynamically route the data to the one or more database in the identified cluster based on identified parameters of the one or more databases. Subsequently, the memory is updated to store the available storage in the one or more clusters and the one or more databases.

20 Claims, 9 Drawing Sheets

METHOD FOR MANAGING STORAGE INSTANCES IN A MULTI CLUSTER ENVIRONMENT AND A SYSTEM THEREOF

FIELD OF THE INVENTION

The present disclosure generally relates to database management for storage instances. Particularly, the present disclosure provides a system and a method for providing reverse proxy module for managing storage instances in a multi-cluster environment resulting in a more scalable storage.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

In general, a multi-cluster environment comprises plurality of databases in different environment and the data from plurality of users are saved in these databases. Each database may have a prescribed user who has the access to store and retrieve the data from the database. Also, the user may choose to store data on a local database or a remote database or on a cloud network. The user's choice of database selection may be driven by lot of factors such as size of the data being stored and retrieve, instances of data storage and retrieval, latency of different database, access to different database based on user profile etc.

Therefore, often a database in one environment may be utilized more than another database in different environment and this scenario leading to un-even distribution in data storage. Also, such scenario lead to database exhaustion resulting in high latency and failures in storing and retrieving data from a database which may affect the performance and user's experience in data drive application.

There is a need for a system in which the storage of data can be managed or orchestrated amongst various databases in multiple clusters, which can result in significant increase in available data store capabilities, improving the overall performance of the database's efficiency in storing and providing the data on demand without delay thereby avoid latency in data retrievable.

Through applied effort, ingenuity, and innovation, the inventors have solved the above problem(s) by developing the solutions embodied in the present disclosure, the details of which are described further herein.

SUMMARY OF THE INVENTION

In general, embodiments of the present disclosure herein provide orchestrating the data storage and retrieval from one or more databases in a multi-cluster environment. Other implementations will be, or will become, apparent to one with skill in the art upon examination of the following figures and detailed description. It is intended that all such additional implementations be included within this description be within the scope of the disclosure and be protected within the scope of the following claims.

In one embodiment, the present disclosure provides a system for orchestrating the storage instances in a multi-cluster environment, said system comprises at least a processor and a memory. The program instructions are stored in the memory which when executed is configured to receive data from one or more devices associated with a user. Upon receiving the data, the profile of the user device is accessed and based on the profile data, one or more clusters and one or more databases are identified in a multi-cluster environment. Further, the processor executes a database optimization algorithm to determine one or more parameters of the database and dynamically route the data to the one or more database in the identified cluster based on identified parameters of the one or more databases. Subsequently, the memory is updated to store the available storage in the one or more clusters and the one or more databases.

In another aspect, the present disclosure provides a method for orchestrating the storage instances in a multi-cluster environment. The method begins with receiving data from one or more devices associated with a user and the user's profile is accessed based on the received data. Once the user's profile is identified, one or more clusters are identified and one or more databases are identified which may be chosen for storing the data. The determination of a particular database amongst multiple databases is based on database optimization algorithm. Further, the data from the user device is routed dynamically to the identified database based on optimization algorithm and subsequently, a memory is updated is store the available storage in one or more clusters and database.

In yet another embodiment, the present disclosure provides a non-transitory computer-readable storage medium storing program instructions for orchestrating the storage instances in a multi-cluster environment, the instructions, when executed, perform the steps of receiving data from one or more devices associated with a user and the user's profile is accessed based on the received data. Once the user's profile is identified, one or more clusters are identified and one or more databases are identified which may be chosen for storing the data. The determination of a particular database amongst multiple databases is based on database optimization algorithm. Further, the data from the user device is routed dynamically to the identified database based on optimization algorithm and subsequently, a memory is updated is store the available storage in one or more clusters and database.

The above summary is provided merely for the purpose of summarizing some exemplary embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
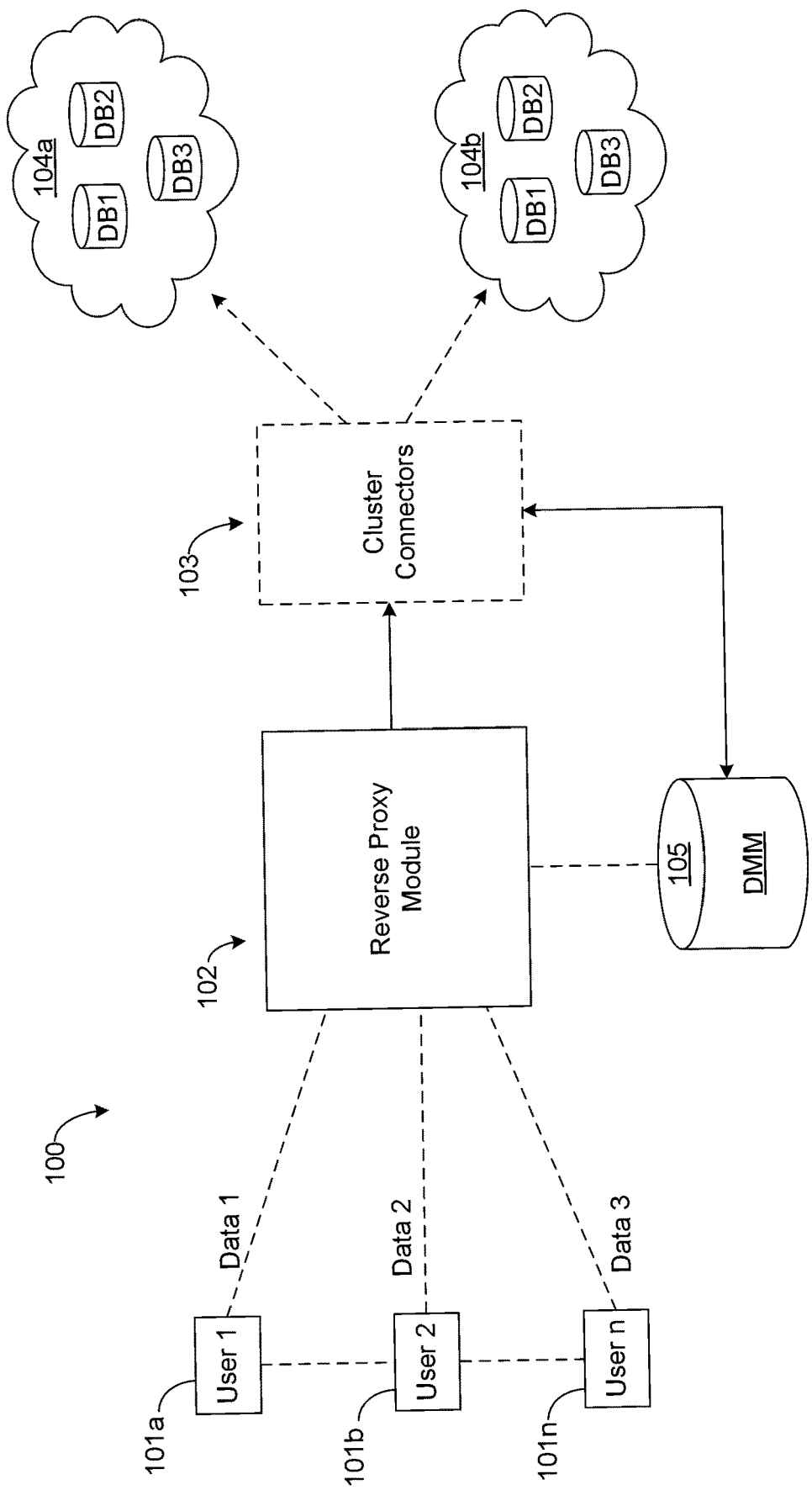
Figure 2:
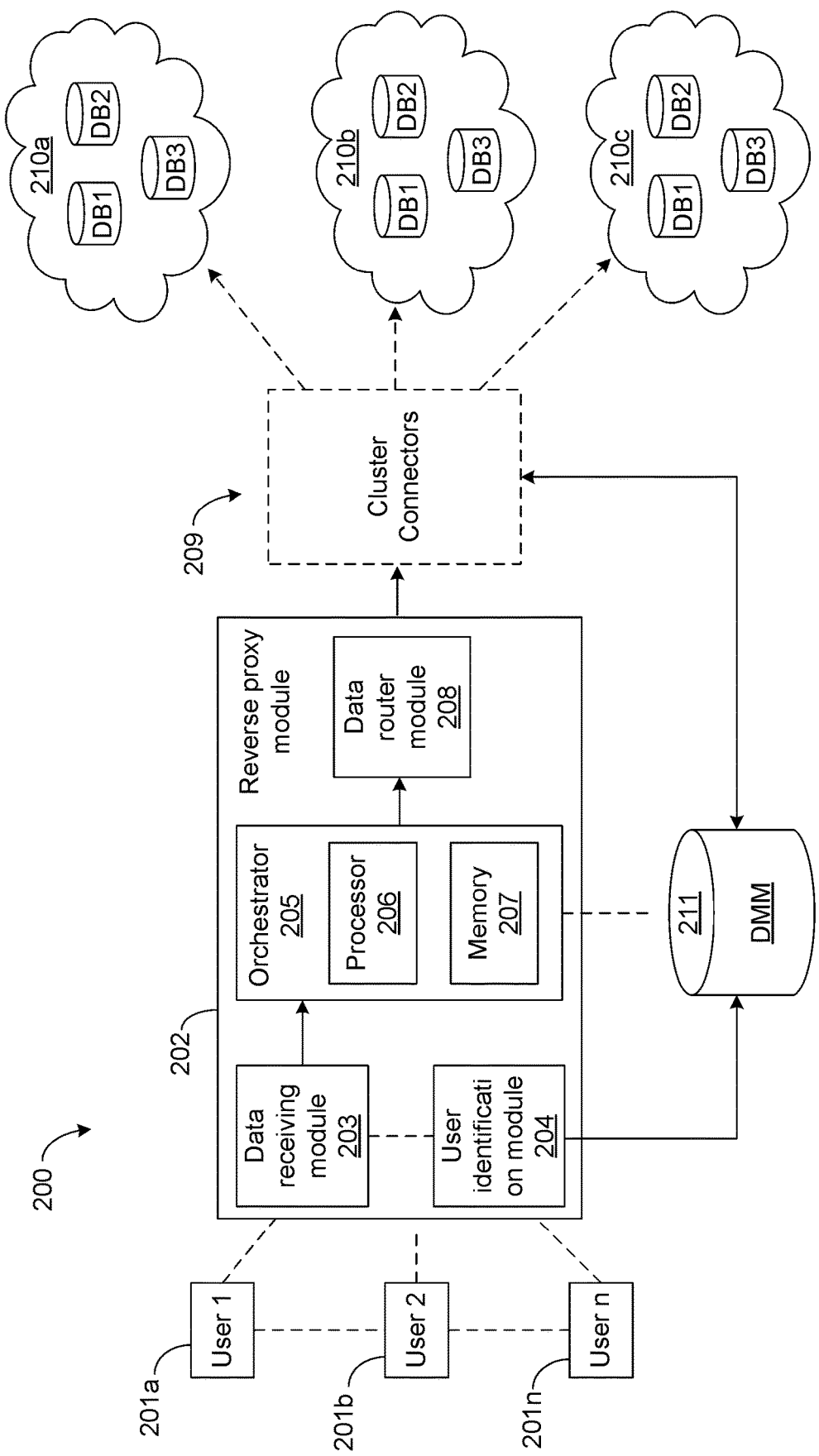
Figure 3:
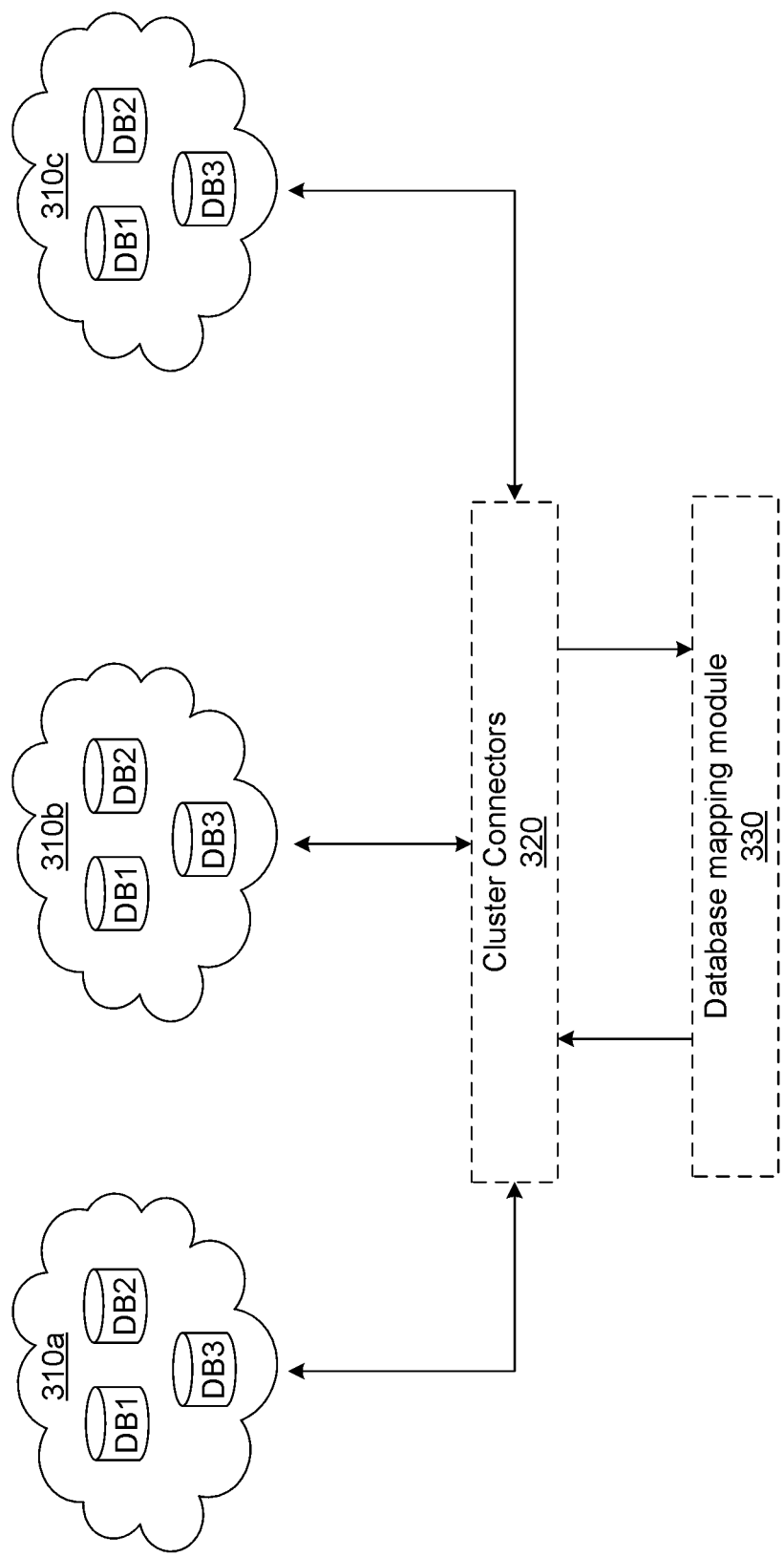
Figure 4:
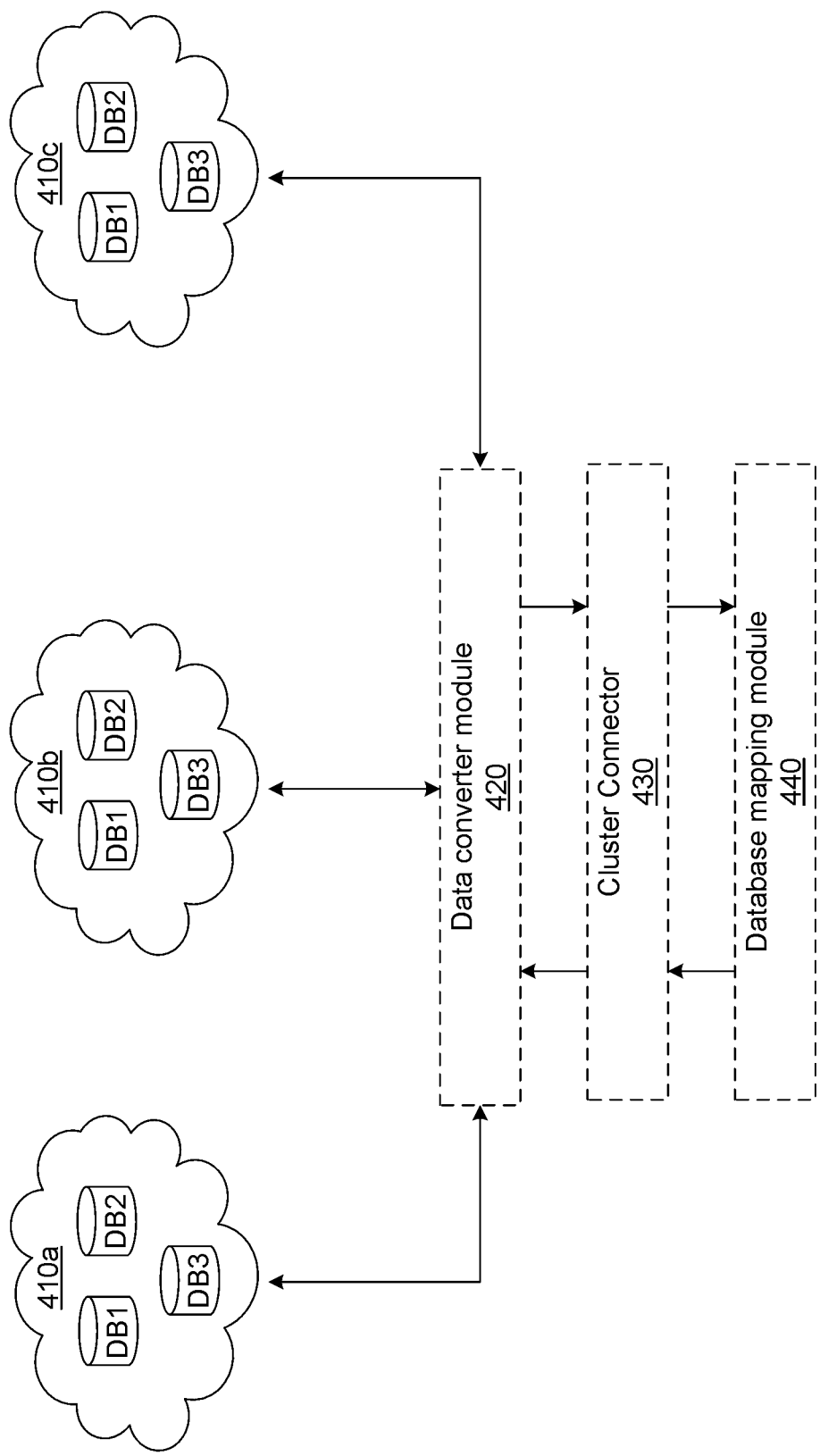
Figure 5:
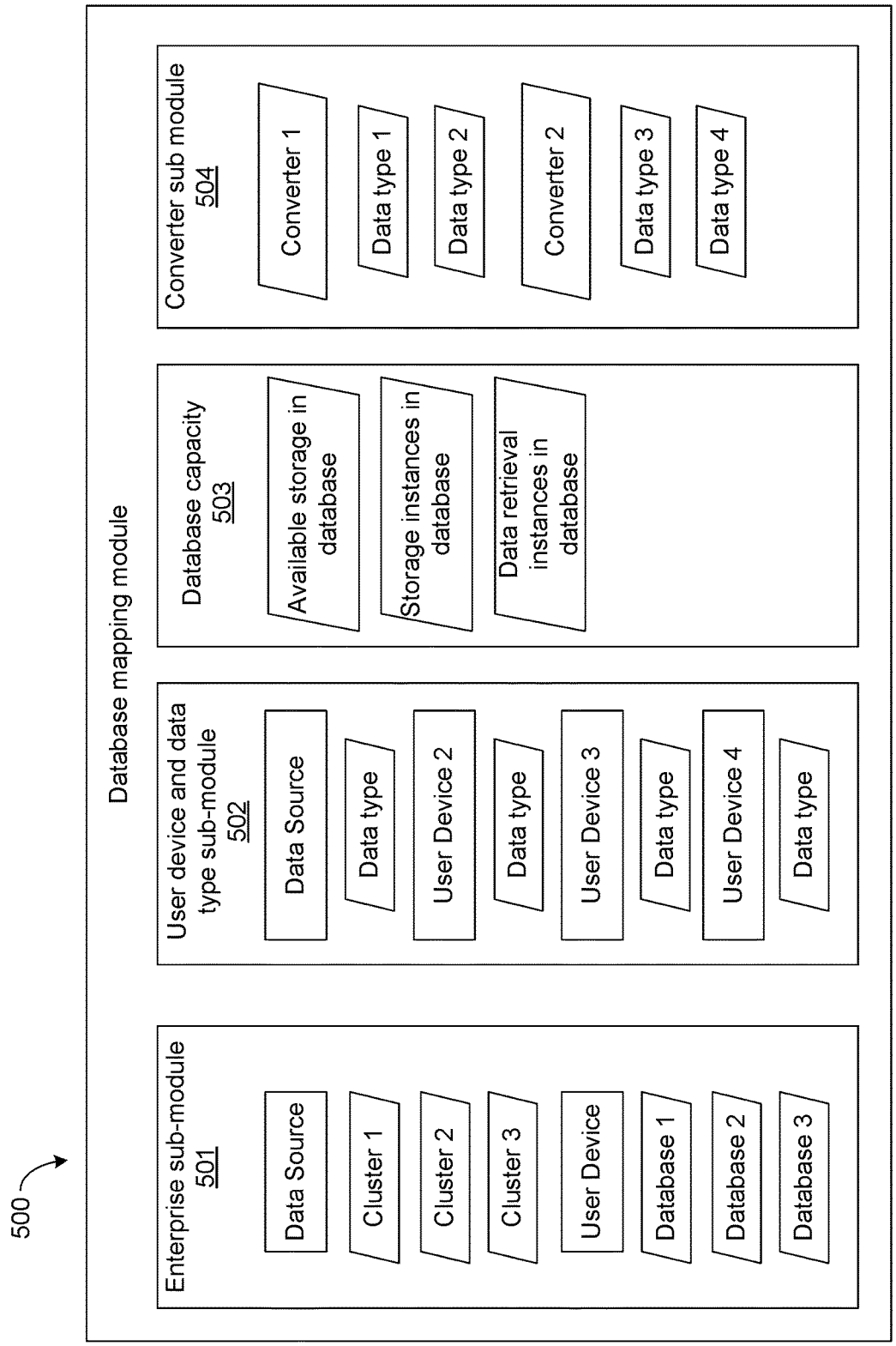
Figure 6:
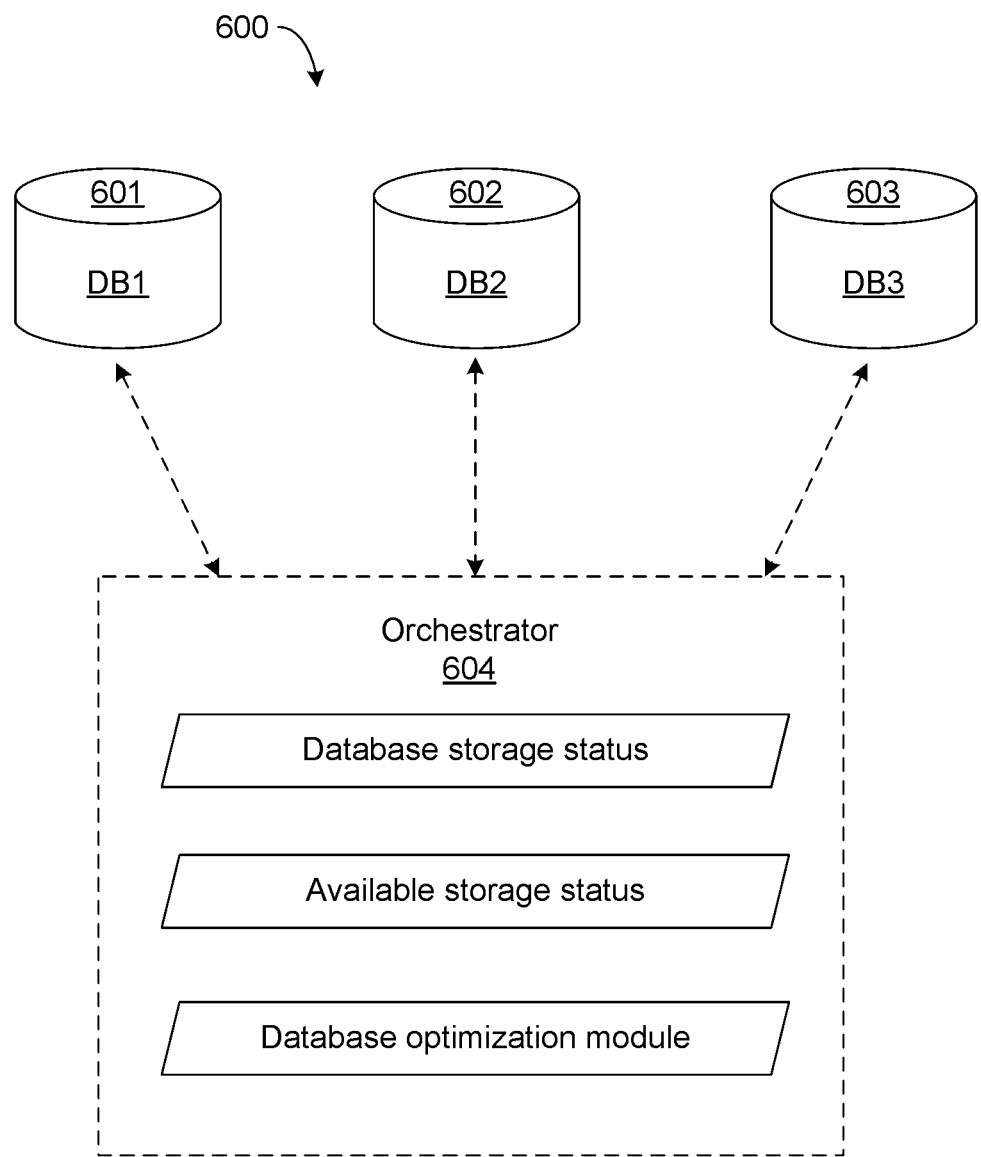
Figure 7:
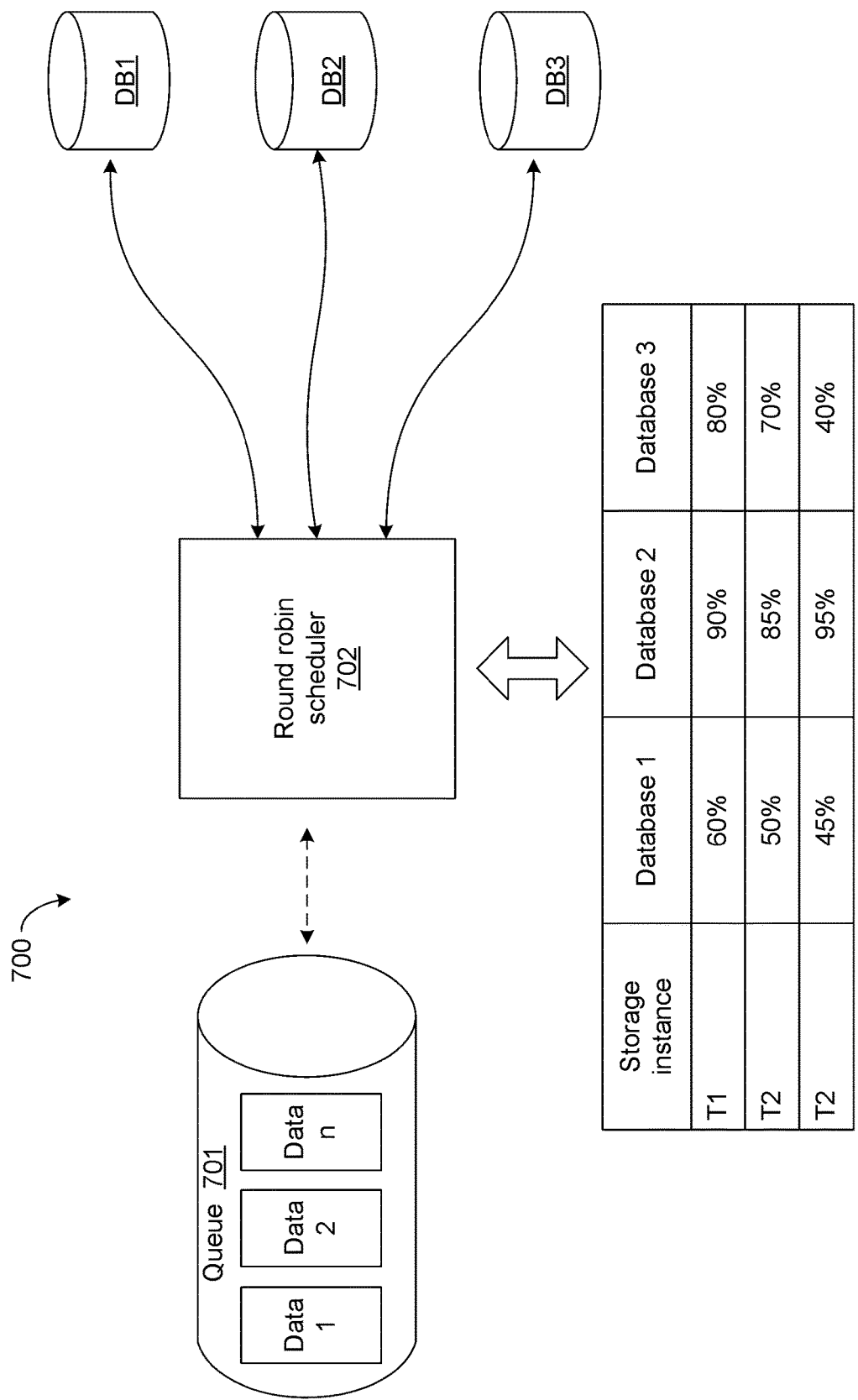
Figure 8:
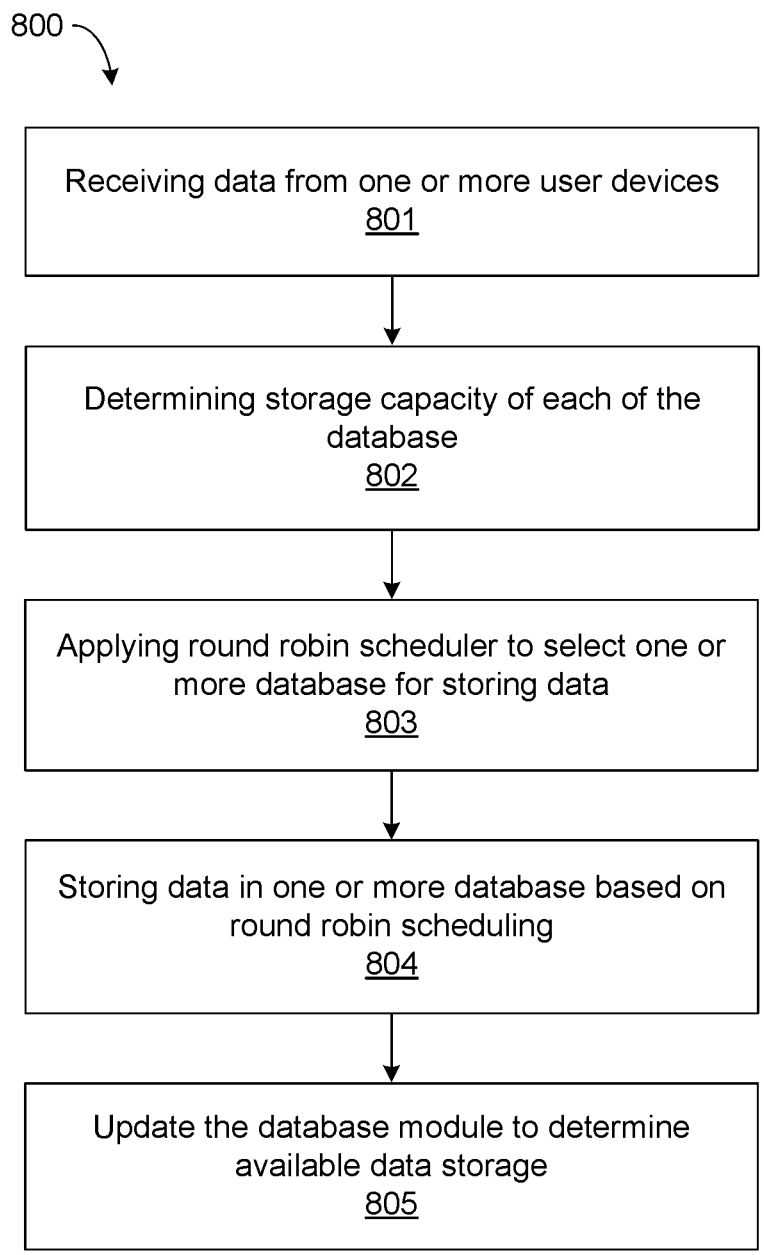
Figure 9:
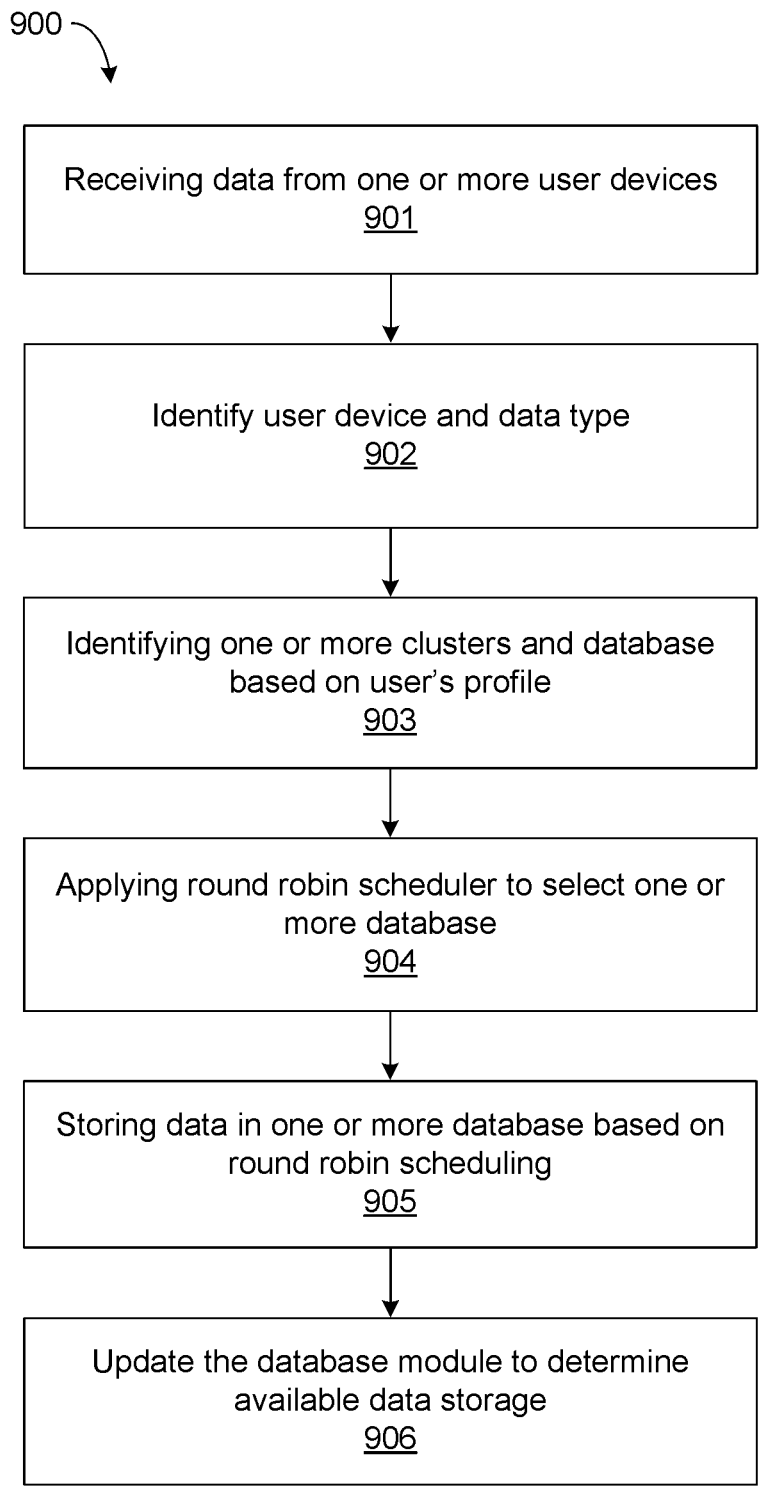

Having thus described the embodiments of the disclosure in general terms, reference now will be made to the accompanying drawings, which are not necessarily drawn to scale, and wherein:

FIG. 1 illustrates an architecture of a system for orchestrating the data storage and retrieval instances in a multi-cluster environment according to one embodiment of the present invention;

FIG. 2 illustrates an exemplary architecture of a system for orchestrating the data storage and retrieval instances in a multi-cluster environment according to another embodiment of the present invention;

FIG. 3 illustrates one embodiment of database mapping module coupled to the multi-cluster environment;

FIG. 4 illustrates another embodiment of database mapping module coupled to the multi-cluster environment;

FIG. 5 illustrates an exemplary embodiment of database mapping module according to an embodiment of the present invention;

FIG. 6 illustrates an embodiment of a reverse proxy module coupled to the multi-cluster environment;

FIG. 7 illustrates an exemplary database management algorithm such as round robin scheduling for selection of a database, in accordance with an embodiment of the present invention;

FIG. 8 illustrates the method steps for providing round robin scheduling for selection of a database, in accordance with an embodiment of the present invention; and FIG. 9 illustrates the method steps for providing orchestrating the storage and retrievable of the data on a multi-cluster environment, in accordance with an embodiment of the present invention.

DETAILED DESCRIPTION OF THE INVENTION

The detailed description set forth below in connection with the appended drawings is intended as a description of various embodiments of the present invention and is not intended to represent the only embodiments in which the present invention may be practiced. Each embodiment described in this invention is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

The present disclosure relates to a system and method for orchestrating the data storage and retrieval from a multi-cluster environment. In general, there are various kinds of database, which may be present in different environment. While some database may be locally located, other database may be at a remote location or at cloud. Also, there could be different types of database which are at different platform. While some database may support a single data model, other database may be able to support multiple data model. For example, Couchbase is a multi-model databases which is designed to support multiple data models to increase versatility. Few examples of databases are Apache Cassandra, MongoDB™, Redis. Also, there are cloud bases databases like Amazon DynamoDB, Couchbase Capella™, MongoDB Atlas.

In general, a database stores information such as text, numbers, images, and more. There are different kinds of databases which can be used to store different types of data. For example, a relational database uses tables to store structured data with defined relationships, like, financial data, inventory management data, and healthcare records. NoSQL databases store diverse data types like documents, key-value pairs, graphs, and more for applications that require flexibility for unstructured or semi-structured data. In another example, there are different type of databases on cloud platform such as Amazon web services (AWS), Oracle database, Azure, Openstack etc.

Users selects and accesses the one or more type of databases which depends on specific goals of user and the type of applications the user intend to work on. Also, database can be on different platforms such as central database, local database or on cloud. The user selects different type of database from different platform based on the intended use.

The user's choice of database selection may be driven by lot of factors such as size of the data being stored and retrieve, instances of data storage and retrieval, latency of different database, access to different database based on user's profile etc. Often, a database in one platform may be utilized more than another database in different platform and this scenario leading to un-even distribution in data storage. Also, such scenario lead to database exhaustion resulting in high latency and failures in storing and retrieving data from a database which may affect the performance and user's experience in data drive application.

The present invention provides a system and a method for orchestrating the storage and data retrieval instances from different databases from multiple platforms, thereby upscaling the storage capacity and reducing latency in data storing and retrieval. A more detailed embodiments of the present invention is explained hereinafter.

FIG. 1 illustrates an exemplary network architecture of the system 100 for orchestrating the data storage and retrieval from one or more databases in a multi-cluster environment, in accordance with an embodiment of the present invention. One or more users 101a . . . 101n are configured to generate data, access one or more databases clusters 104a, 104b for data storage and retrieval. The users 101a . . . 101n are configured to send and receive data from one or more database over the network, which may be wired network or wireless network.

Each of the users 101a . . . 101n may be associated with a user device which generates the data for storage. The user devices may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein.

The databases clusters 104a, 104b are configured to save the data obtained from one or more users 101a . . . 101n and save the data in a structured manner. In one embodiment, the database clusters 104a, 104b comprises one or more databases $DB_{1...n}$, wherein each database may be a same type of database, different type of database. Each of the database may be configure to save a particular type of data in a particular format. In an embodiment, each of the database $DB_{1...n}$ in the cluster 104a, 104b may be located at different locations, for example, local, centralized location or at cloud. In another embodiment, each of the database cluster 104a, 104b may be either local, centralized or distributed.

The system 100 further comprises a reverse proxy module 102 which acts as an intermediary between one or more users 101a . . . 101n and databases clusters 104a, 104b. The reverse proxy module 102 is coupled to a database mapping module 105. The database mapping module 105 is configured to maintain a lookup table dynamically maintains the available storage in one or more databases based on data storage and retrieval instances, user's profiles and its subscription data to one or more databases, data type associated with each user and user devices. Further, the reverse proxy module 102 and the database mapping module 105 is coupled to a cluster connector 103. The cluster connector 103 is configured to act as an interface between reverse proxy module 102 and clusters 104a, 104b and directs the data to one or more clusters based on instructions received from the reverse proxy module 102.

The reverse proxy module 102 receives the data from the users 101a . . . 101n over the network. The reverse proxy module 102, based on received data, retrieves the user identity, user profile and its subscription to one or more database from the database mapping module 105. Also, reverse proxy module 102 receives the information indicating the available data storage in one or more databases. The reverse proxy module 102 based on size of data to be stored and available data storage in one or more databases, orchestrates the data storage in available databases. In one embodiment, the reverse proxy module 102 employs optimization algorithms to select one or more database for storing the received data. In a non-limiting embodiment, the optimization algorithms may include round-robin scheduling.

The reverse proxy module 102 forwards the data to the cluster connectors 103 with instructions and database identifier, which should be used for data storage. In one embodiment, the data received from the user may be stored in a single database. In another embodiment, the data received from the user may be distributed amongst different databases in same cluster. In yet another embodiment, the data received from the user may be distributed amongst different databases in different cluster. In yet another embodiment, the data received from the user may be stored in databases from different platform.

Upon completion of data storage in the selected database, the cluster connector provides the acknowledgement to the reverse proxy module. Also, the cluster connector provides the feedback information to the database mapping module 105, said feedback information provides updated available storage information of one or more databases. In another embodiment, the cluster connector 103 is configured to provide regular feedback information after predetermined time period based upon which the database mapping module 105 is updated to identify available data storages in one or more clusters and databases. In yet another embodiment, the cluster connector 103 dynamically updates the database mapping module 105 identify available data storages in one or more clusters and databases.

The system 100 results in upscaling of database resources due to optimization algorithm and results in efficient use of available data storage.

FIG. 2 illustrates another exemplary module-based architecture 200 for orchestrating the storage instances in a multi-cluster environment.

A system 200 is provided having one or more users 201a-201n who are configured to generate data which are stored in the clusters of databases. A multi-cluster environment 2110a-210c is provided which includes cluster of databases $DB_{1...n}$. The system 200 provides a reverse proxy module 202 which acts as an intermediary module between one or more users 201a-201n and multi-cluster environment. The reverse proxy module 202 is primarily responsible for receiving data from the users, orchestrating the storage instances with the databases and store the data based on an optimization algorithm.

In an embodiment, the reverse proxy module 202 may comprise one or more modules which are configured to one or more functions to achieve the objective of the present invention. One or more modules of the system may be implemented using one or more processor(s) or said modules may be hardware, computer software, or any combination thereof. Each of the modules and its functionality, according to the embodiments of the present invention, is explained below in detail.

Each of the users 201a . . . 201n may be associated with a user device which generates the data for storage in one or more databases in clusters 210a . . . 210c. The databases clusters 210a . . . 210c are configured to save the data obtained from one or more users 201a . . . 201n and save the data in a structured manner. In one embodiment, the database clusters 210a . . . c comprises one or more databases $DB_{1...n}$, wherein each database may be a same type of database, different type of database. Each of the database may be configure to save a particular type of data in a particular format. In an embodiment, each of the database $DB_{1...n}$ in the cluster may be located at different locations, for example, local, centralized location or at cloud. In another embodiment, each of the database cluster may be either local, centralized or distributed.

The reverse proxy module 202 acts as an intermediary between one or more users 201a . . . 201n and databases clusters 210a . . . c. The reverse proxy module 202 comprises at least data receiving module 203, user identification module 204, an orchestrator 205 and a data router module 208. The router module 208 is coupled to the cluster connector 209. Further, the orchestrator 205 and the cluster connector 209 are coupled to the database mapping module 211.

The data receiving module 203 is configured to receive the data from one or more user devices 201a . . . 201n. The data receiving module 203 identifies one or more parameters associated with the received data, said parameters may include at least one of data size, data type, user device identification, user identification. The data receiving module 203 is further coupled to the user identification module 204. The data receiving module 203 enquires the user identification module for retrieval of user's profile and access rights. The user identification module 204 is further coupled to the database mapping module 211. Detailed embodiments of database mapping module 211 is explained below with reference to FIG. 5.

The database mapping module 211 receives the query from the user identification module 204 to retrieve user's profile and access rights information. The database mapping module 211 determines the user's profile and send the information to the user identification module 204. Based on the determination that the user has access rights to one or more databases, storage limit for the user, said information along with received data is transmitted to the orchestrator.

The orchestrator 205 comprises a processor 206 and a memory 207. The processor 206 of the orchestrator 205 comprises one or more program instructions, which when executed, is configured to perform one or more functions of orchestrating the storage instances. The orchestrator 205 upon receiving the information from the user identification module 204 indicating the user's profile, access rights to database, received data size, data type, user's access to specific database type, said information is forwarded to the database mapping module for determining which database can be used for storing the data for better optimization.

The database mapping module 211 is configured to maintain a lookup table dynamically maintains the available storage in one or more databases based on data storage and retrieval instances, user's profiles and its subscription data to one or more databases, data type associated with each user and user devices. The database mapping module 211 determines the currently available storage capacity of each of the database in the cluster and send the information to the orchestrator 205. The orchestrator 205 based on received information on available storage capacity, apply optimization algorithms to determine the appropriate database for storing the data and forward the received data and database indicators to cluster connector 209 via a data routing module 208. In a non-limiting embodiment, the optimization algorithms may include round-robin scheduling.

The cluster connector 209 is configured to act as an interface between the orchestrator 205 and database clusters 210a . . . c and directs the data to one or more clusters for storing the data based on instructions received from the orchestrator 205. In one embodiment, the data received from the user may be stored in a single database. In another embodiment, the data received from the user may be distributed amongst different databases in same cluster. In yet another embodiment, the data received from the user may be distributed amongst different databases in different cluster. In yet another embodiment, the data received from the user may be stored in databases from different platform.

Upon completion of data storage in the selected database, the cluster connector 209 provides the acknowledgement to the orchestrator 205. Also, the cluster connector 209 provides the feedback information to the database mapping module, said feedback information provides updated available storage information of one or more databases. In another embodiment, the cluster connector 209 is configured to provide regular feedback information after predetermined time period based upon which the database mapping module 211 is updated to identify available data storages in one or more clusters and databases. In yet another embodiment, the cluster connector 209 dynamically updates the database mapping module 211 to identify available data storages in one or more clusters and databases.

FIG. 3 illustrates an exemplary architecture for updating the database mapping module 330 based on storage instances in accordance with the present invention. For orchestrator to effectively execute the optimization algorithms, the database mapping module 330 should store the data on available data storage of one or more databases in multi-cluster environment.

As depicted in FIG. 3, the cluster connector 320 acts an interface between the database clusters 310a . . . c and database mapping module 330. The database mapping module 330 maintains a lookup table indicating the available storage in one or more databases based on data storage and retrieval instances, user's profiles and its subscription data to one or more databases, data type associated with each user and user devices. The database mapping module 330 determines the currently available storage capacity of each of the database in the cluster and send the information to the orchestrator. The orchestrator based on received information on available storage capacity, apply optimization algorithms to determine the appropriate database for storing the data and forward the received data and database indicators to cluster connector.

The cluster connector 320 is configured to act as an interface between the orchestrator and clusters and directs the data to one or more clusters for storing the data based on instructions received from the orchestrator. Upon completion of data storage in the selected database, the cluster connector 320 provides the acknowledgement to the orchestrator.

In an embodiment, the cluster connector 320 provides the feedback information to the database mapping module 330, said feedback information provides updated available storage information of one or more databases. In another embodiment, the cluster connector 320 is configured to provide regular feedback information after predetermined time period based upon which the database mapping module 330 is updated to identify available data storages in one or more clusters and databases. In yet another embodiment, the cluster connector 320 dynamically updates the database mapping module 330 identify available data storages in one or more clusters and databases.

In this way, the database mapping module 330 maintains the updated list of the available storage in the database cluster.

FIG. 4 illustrates another embodiment, wherein a data converter module 420 may be provided which can be coupled to the cluster connector 430. The data received from one or more user device may be in a different format not compatible with the database. In such scenario, there is a need to convert the data to one or more preferred format based on selection of the database by the orchestrator. Each database in the cluster may have different format in which the data is stored and retrieved.

The database mapping module 440 maintains a lookup table indicating the available storage in one or more databases based on data storage and retrieval instances, user's profiles and its subscription data to one or more databases, data type associated with each user and user devices. The database mapping module 440 may also comprise a mapping of user devices and its data type. Based on the determination that the user has access to specific database and the originated data needs to be converted before it is saved, the database mapping module 440 send the converter indicator to the cluster connector 430.

The cluster connector 430 directs the data to one or more clusters for storing the data based on instructions received from the orchestrator. In one embodiment, the cluster connector 430 may send data to the converter module for data conversion in accordance with converter identifier provided by database mapping module 440 and the converted data is sent back to the cluster connector 430 for storing in one or more database. In another embodiment, the orchestrator may directly send the data to the converter module for conversion according to the converter identifier and the converted data is forwarded to the cluster connector 430 for directing the data for storage into the selected database.

The converter module 420 according to an embodiment, comprises one or more data converter which may be utilized for converting data from one format to another. When, the received data size exceeds memory storage in one database, the data needs to be split up and saved in different database. The received data may divided into first part to be saved in first database and second part to be saved in second database. One database may have different format for saving the data as compared to the other database. In such scenario, the first part of data can be saved in first database according to a first format and the second part of data can be saved in second database after converting the format of the second part of data to a second format which is compatible with the second database.

In another embodiment, the converter module can be part of cloud database, wherein the received data is converted to the compatible format before saving the data into the database.

FIG. 5 illustrates an exemplary embodiment of database mapping module 500 according to an embodiment of the present invention;

The database mapping module 500 stores configuration details of enterprises and user devices generating the data. The configuration details include the list of enterprises, list of user devices belonging to one or more enterprises, the data type in respect of one or more user devices, routing rules and settings for routing the data to converters.

The database mapping module 500 includes a memory which stores one or more sub-modules namely, an enterprise sub-module 501, a user device and data type sub-module 502, a rule sub-module 503 and a converter sub-module 504.

The memory may be non-transitory and may include, for example, one or more volatile and/or non-volatile memories. In some embodiments, the memory includes or embodies an electronic storage device (e.g., a computer readable storage medium). In some embodiments, the memory is configured to store information, data, content, applications, instructions, or the like, for enabling a system to carry out various operations and/or functions in accordance with example embodiments of the present disclosure.

In an embodiment, the enterprise sub-module 501 identifies one or more enterprises and its domain ID. Further, the enterprise sub-module 501 also includes a list of user/user devices which belongs to the one or more enterprises. The module 501 including mapping details of user/user devices and corresponding database clusters based on its access rights, mapping of user devices with corresponding databases based on the user profile and access rights.

In a further embodiment, the user device and data type sub-module 502 provides the association of one or more user device with a data type. The data type of files generated by one or more user devices is established and association is created in the data type sub-module. In an exemplary embodiment, one or more non-standard format generated by the user device may include file with extensions for example .doc, .xls, .csv, .ppt, .pdf, and other additional data type such as image file, message stream.

Further, database capacity module 503 includes data indicating the storage capacity available in one or more databases in the multi-cluster environment. The database capacity module maintains the look up table indicating % available storage capacity. Further, the module 503 is also configured to maintain the data storage instances in one or more databases and the data retrieval instances in one or more databases. Furthermore, the module 503 is configured to update the available storage capacity of the database based on data storage and retrieval instances.

In a further embodiment, the converter sub-module 504 associates one or more data type to one or more converters for data conversion. In an exemplary embodiment, a specific data type may be converted by one or more converters. In a further embodiment, one or more user devices may be associated to one or more converters based on their data type.

The database mapping module 500 is accessed by the orchestrator to identify user profile, data type, pre-configured rule/settings if any. As explained above, the database mapping module 500 is updated from time to time based on instances of data storage and retrieval from the databases in the multi-cluster environment and such updated information is available to the orchestrator for effectively routing the data to the appropriate database.

In an embodiment, the database mapping module 500 can be an integral part of the orchestrator. In an alternative embodiment, the database mapping module 500 can be remotely located which can be accessed by the orchestrator through a network.

FIG. 6 illustrates an embodiment of an orchestrator coupled to the multi-cluster environment. The orchestrator 604 receives data from the database mapping module indicative of the available storage space in one or more database in the clusters. The orchestrator module executes an optimization algorithm to identify one or more database which can be used to save the received data. In a non-limiting embodiment, the optimization algorithm may include round robin scheduling, implementation of which is further explained below.

The orchestrator may implement a round robin scheduling according to an embodiment of the present invention. In this manner, a threshold value is set for each database, said threshold value determines when the data storing instance should be shifted to other database. When a first data is forwarded to the orchestrator for storage, the orchestrator selects a first database from the cluster for storing the receiving first data, selection of first database is based on determination that the available storage in said database is above a threshold and the available storage is sufficient to save the first data. subsequently, a second data from the queue is received for storing and the orchestrator determines the available storage in the selected first database.

In one embodiment, if the available storage in the first database is now below the threshold value, the orchestrator identifies a second database and its storage capacity as compared to the threshold. If the second database's available storage is above threshold and sufficient to save the second data, the orchestrator sends the second data to the second database for storing the data.

Alternatively, if the available storage in the first database is above the threshold value and sufficient to save the second data, the orchestrator sends the second data to the first database for storing the data.

In another embodiment, one or more users also retrieve or delete the data from the database resulting in increase in the available storage in the databases. The database mapping module, based on feedback of cluster connectors, is dynamically updated on the available storage space based on data retrieval or deletion from the databases and said updated information on the available storage is provided to the orchestrator for executing optimization algorithm.

FIG. 7 illustrates an exemplary optimization algorithm such as round robin scheduling for selection of a database, in accordance with an embodiment of the present invention.

In an embodiment, a queue 701 is provided which is configured for queueing one or more data streams $Data_{1 \ldots n}$. one or more data stream from the queue is forwarded to the orchestrator 702 for storing the data to one or more databases. In one embodiment, the data from the queue can be provided in a serial manner to the orchestrator. In another embodiment, the data from the queue can be provided to the orchestrator in a parallel manner.

The orchestrator module 702 receives the data from the database mapping module indicative of the available storage space in one or more database in the clusters. The orchestrator module executes an optimization algorithm to identify one or more database which can be used to save the received data. In a non-limiting embodiment, the optimization algorithm may include round robin scheduling, implementation of which is explained below.

In an embodiment, the database mapping module may maintain a look up table which provides databases along with its % available storage capacity. The orchestrator may implement a round robin scheduling according to an embodiment of the present invention. A threshold value is set for each database, said threshold value determines when the data storing instance should be shifted to other database. When a first data is forwarded to the orchestrator for storage, the orchestrator selects a first database from the cluster for storing the receiving first data, selection of first database is based on determination that the available storage in said database is above a threshold and the available storage is sufficient to save the first data.

Subsequently, a second data from the queue is received for storing and the orchestrator determines the available storage in the selected first database. In one embodiment, if the available storage in the first database is now below the threshold value, the orchestrator identifies a second database and its storage capacity as compared to the threshold. If the second database's available storage is above threshold and sufficient to save the second data, the orchestrator sends the second data to the second database for storing the data. Alternatively, if the available storage in the first database is above the threshold value and sufficient to save the second data, the orchestrator sends the second data to the first database for storing the data.

In an embodiment, the orchestrator may implement re-executing the optimization algorithm after pre-determined time before selection of other database for data storage. In an example, when a first data is forwarded to the orchestrator for storage, the orchestrator selects a first database from the cluster for storing the receiving first data, selection of first database is based on determination that the available storage in said database is above a threshold and the available storage is sufficient to save the first data. Subsequently, a second data from the queue is received for storing and the orchestrator determines the available storage in the selected first database. At time $t_1$, it is determined that the available storage is below the threshold value. After a predetermined time, the optimization algorithms are re-executed at time $t_2$ to determine if the available storage in the first database is above the threshold. After determining that the available storage is above threshold, at time t2 as compared to t1, the orchestrator directs the first data to be stored in the first database.

FIG. 8 illustrates the method steps for providing round robin scheduling for selection of a database, in accordance with an embodiment of the present invention.

In Step 801, one or more data stream is received from user devices by the reverse proxy module. In an embodiment, the reverse proxy module may comprise a queue for queueing one or more data streams Data 1 . . . n. In one embodiment, the data from the queue can be provided in a serial manner to the orchestrator. In another embodiment, the data from the queue can be provided to the orchestrator in a parallel manner.

In Step 802, the reverse proxy module queries the database mapping module for determine available storage capacity of each of the database in the cluster environment. In an embodiment, the database mapping module may maintain a look up table which provides databases along with its % available storage capacity. Further, the database mapping module is configured to be updated after each data storage and retrieval instance.

In Step 803, the reverse proxy module receives the information from the database mapping module indicative of the available storage space in one or more database in the clusters. The reverse proxy module executes an optimization algorithm to identify one or more database which can be used to save the received data. The reverse proxy module implements a round robin scheduling according to an embodiment of the present invention. A threshold value is set for each database, said threshold value determines when the data storing instance should be shifted to other database. When a first data is forwarded to the orchestrator for storage, the orchestrator selects a first database from the cluster for storing the receiving first data, selection of first database is based on determination that the available storage in said database is above a threshold and the available storage is sufficient to save the first data. Subsequently, a second data from the queue is received for storing and the orchestrator determines the available storage in the selected first database. In one embodiment, if the available storage in the first database is now below the threshold value, the orchestrator identifies a second database and its storage capacity as compared to the threshold. If the second database's available storage is above threshold and sufficient to save the second data, the orchestrator sends the second data to the second database for storing the data. Alternatively, if the available storage in the first database is above the threshold value and sufficient to save the second data, the orchestrator sends the second data to the first database for storing the data.

In Step 804, the reverse proxy module forwards the data to the selected database, based on round robin scheduling, for storage.

In Step 805, Once the data is stored in the selected database, the database mapping module is updated to reflect the updated available storage capacity, which is taken into consideration when the reverse proxy module re-executes the round robin scheduling for second set of data for storage.

FIG. 9 illustrates the method steps for providing orchestrating the storage and retrievable of the data on a multi-cluster environment, in accordance with an embodiment of the present invention.

In Step 901, one or more users generate data and send the data to the orchestrator for storing in the cluster of databases. Each of the users 201a . . . 201n may be associated with a user device which generates the data for storage in one or more databases in clusters 210a . . . 210c. The data receiving module 203 is configured to receive the data from one or more user devices 201a . . . 201n.

In Step 902, one or more parameters associated with the received data is determined. In an embodiment, the data receiving module 203 identifies one or more parameters associated with the received data, said parameters may include at least one of data size, data type, user device identification, user identification. The data receiving module 203 is further coupled to the user identification module 204. The data receiving module 203 enquires the user identification module for retrieval of user's profile and access rights. The user identification module 204 is further coupled to the database mapping module 211. The database mapping module 211 receives the query from the user identification module 204 to retrieve user's profile and access rights information. The database mapping module 211 determines the user's profile and send the information to the user identification module 204. Based on the determination that the user has access rights to one or more databases, storage limit for the user, said information along with received data is transmitted to the orchestrator.

In Step 903, one or more databases of clusters are identified based on user's profile. The database mapping module 211 determines the user's profile and identify database to which the user subscribes along with access rights, storage limit for the user, and said information along with received data is transmitted to the orchestrator.

In Step 904, the orchestrator applies database optimization algorithm to store the received data in one or more selected database. The orchestrator 205 comprises a processor 206 and a memory 207. The processor 206 of the orchestrator 205 comprises one or more program instructions, which when executed, is configured to perform one or more functions of orchestrating the storage instances. The orchestrator 205 upon receiving the information from the user identification module 204 indicating the user's profile, access rights to database, received data size, data type, user's access to specific database type, said information is forwarded to the database mapping module for determining which database can be used for storing the data for better optimization. The database mapping module 211 is configured to maintain a lookup table dynamically maintains the available storage in one or more databases based on data storage and retrieval instances, user's profiles and its subscription data to one or more databases, data type associated with each user and user devices. The database mapping module 211 determines the currently available storage capacity of each of the database in the cluster and send the information to the orchestrator 205. The orchestrator 205 based on received information on available storage capacity, apply optimization algorithms to determine the appropriate database for storing the data and forward the received data and database indicators to cluster connector 209 via a data routing module 208. In a non-limiting embodiment, the optimization algorithms may include round-robin scheduling.

In applying round robin scheduling, a threshold value is set for each database, said threshold value determines when the data storing instance should be shifted to other database. When a first data is forwarded to the orchestrator for storage, the orchestrator selects a first database from the cluster for storing the receiving first data, selection of first database is based on determination that the available storage in said database is above a threshold and the available storage is sufficient to save the first data. Subsequently, a second data from the queue is received for storing and the orchestrator determines the available storage in the selected first database. In one embodiment, if the available storage in the first database is now below the threshold value, the orchestrator identifies a second database and its storage capacity as compared to the threshold. If the second database's available storage is above threshold and sufficient to save the second data, the orchestrator sends the second data to the second database for storing the data. Alternatively, if the available storage in the first database is above the threshold value and sufficient to save the second data, the orchestrator sends the second data to the first database for storing the data.

In Step 905, the orchestrator based on determining a database for storing the data, forwards the data through the cluster connectors for saving the data in one or more database. The cluster connector 209 is configured to act as an interface between the orchestrator 205 and database clusters 210a . . . c and directs the data to one or more clusters for storing the data based on instructions received from the orchestrator 205. In one embodiment, the data received from the user may be stored in a single database. In another embodiment, the data received from the user may be distributed amongst different databases in same cluster. In yet another embodiment, the data received from the user may be distributed amongst different databases in different cluster. In yet another embodiment, the data received from the user may be stored in databases from different platform.

In Step 906, the database mapping module is updated to determine available data storage. Upon completion of data storage in the selected database, the cluster connector 209 provides the acknowledgement to the orchestrator 205. Also, the cluster connector 209 provides the feedback information to the database mapping module, said feedback information provides updated available storage information of one or more databases. In another embodiment, the cluster connector 209 is configured to provide regular feedback information after predetermined time period based upon which the database mapping module 211 is updated to identify available data storages in one or more clusters and databases. In yet another embodiment, the cluster connector 209 dynamically updates the database mapping module 211 to identify available data storages in one or more clusters and databases.

The implementation of the present invention results in substantial upscaling of the database, as the data storage is not restricted to one database, rather all the databases in the cluster are considered for data storage and also, round robin scheduling improves the overall utilization of data storage available on the database in a multi-cluster environment.

In some embodiments, the network may be a public network (e.g., the Internet), a private network (e.g., an internal localized, or closed-off network between particular devices). In some other embodiments, the network may be a hybrid network (e.g., a network enabling internal communications between particular connected devices and external communications with other devices). In various embodiments, the network may include one or more relay(s), router(s), switch(es), routing station(s), and/or the like.

The figures of the disclosure are provided to illustrate some examples of the invention described. The figures are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a script language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or repository. Software components may be static (e.g., pre-established, or fixed) or dynamic (e.g., created or modified at the time of execution).

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

We claim:

1. A system for orchestrating storage instances in a multi-cluster environment, comprising:
   a processor;
   a memory storing program instructions which, when executed by the processor, causes the processor to:
   receive data from one or more devices associated with a user;
   access a profile of the user based on the received data;
   identify one or more clusters and one or more databases in the multi-cluster environment based on the profile of the user, wherein each cluster of the one or more clusters comprises the one or more databases;
   determine, via a database optimization algorithm, one or more parameters of the one or more databases;
   dynamically route the data to the one or more databases in the identified one or more clusters based on the one or more parameters of the one or more databases;
   update, based on the routed data, the memory to store available data storage in the one or more clusters and the one or more databases; and
   generate a lookup table that includes the available data storage in the one or more clusters and the one or more databases.

2. The system of claim 1, wherein, in determining the one or more parameters of a database of the one or more databases, the processor is further configured to:
   determine at least one of total storage capacity of the database, available storage capacity of the database, frequency of data storage and retrieval from the database, latency of the database, available storage of the database corresponding to the received data from the one or more devices.

3. The system of claim 1, wherein the processor is further configured to:
   provide a mapping of the one or more user-devices with the one or more clusters in the multi-cluster environment.

4. The system of claim 1, wherein the database optimization algorithm includes round-robin scheduling and the processor is further configured to:
   execute the round-robin scheduling for optimizing data storage in the one or more clusters and the one or more databases.

5. The system of claim 4, wherein the processor is further configured to:
dynamically optimize cluster resources based on demand of one or more users.

6. The system of claim 1, wherein the processor is further configured to:
provide at least one converter for converting the data from the one or more devices based on the identified one or more databases for data storage.

7. The system of claim 1, wherein the processor is further configured to:
establish a plurality of communication channels for routing the data to the one or more clusters.

8. A method for orchestrating storage instances in a multi-cluster environment, comprising:
receiving data from one or more devices associated with a user;
accessing a profile of the user based on the received data;
identifying one or more clusters and one or more databases in the multi-cluster environment based on the profile of the user, wherein each cluster of the one or more clusters comprises the one or more databases;
determining, via a database optimization algorithm, one or more parameters of the one or more databases;
dynamically routing the data to the one or more databases in the identified one or more clusters based on the one or more parameters of the one or more databases;
updating, based on the routing of the data, a memory to store available data storage in the one or more clusters and the one or more databases; and
generating a lookup table that includes the available data storage in the one or more clusters and the one or more databases.

9. The method of claim 8, further comprising:
determining at least one of total storage capacity of a database of the one or more databases, available storage capacity of the database, frequency of data storage and retrieval from the database, latency of the database, available storage of the database corresponding to the received data from the one or more devices.

10. The method of claim 8, further comprising:
providing a mapping of the one or more devices with the one or more clusters in the multi-cluster environment.

11. The method of claim 8, wherein the database optimization algorithm includes round-robin scheduling, the method further comprising:
executing the round-robin scheduling for optimizing data storage in the one or more clusters and databases.

12. The method of claim 11, further comprising:
optimizing cluster resources dynamically based on demand of one or more users.

13. The method of claim 8, further comprising:
providing at least one converter for converting the data from the one or more devices based on the identified one or more databases for data storage.

14. The method of claim 8, further comprising:
establishing a plurality of communication channels for routing the data to the one or more clusters.

15. A non-transitory computer-readable storage medium storing program instructions for orchestrating storage instances in a multi-cluster environment, the instructions, when executed, perform the steps of:
receiving data from one or more devices associated with a user;
accessing a profile of the user based on the received data;
identifying one or more clusters and one or more databases in the multi-cluster environment based on the profile of the user, wherein each cluster of the one or more clusters comprises the one or more databases;
determining, via a database optimization algorithm, one or more parameters of the one or more databases;
dynamically routing the data to the one or more databases in the identified one or more clusters based on the one or more parameters of the one or more databases;
updating, based on the routing of the data, a memory to store available data storage in the one or more clusters and the one or more databases; and
generating a lookup table that includes the available data storage in the one or more clusters and the one or more databases.

16. The non-transitory computer-readable storage medium as claimed in claim 15, further comprising program instructions to perform the steps of:
determining at least one of total storage capacity of a database of the one or more databases, available storage capacity of the database, frequency of data storage and retrieval from the database, latency of the database, available storage of the database corresponding to the received data from the one or more devices.

17. The non-transitory computer-readable storage medium as claimed in claim 15, further comprising program instructions to perform the steps of:
providing a mapping of the one or more devices with one or more clusters in the multi-cluster environment.

18. The non-transitory computer-readable storage medium as claimed in claim 15, wherein the database optimization algorithm includes round-robin scheduling, the program instructions to perform the steps of:
executing the round-robin scheduling for optimizing data storage in one or more clusters and databases.

19. The non-transitory computer-readable storage medium as claimed in claim 18, further comprising program instructions to perform the steps of:
optimizing cluster resources dynamically based on demand of one or more users.

20. The non-transitory computer-readable storage medium as claimed in claim 15, further comprising program instructions to perform the steps of:
providing at least one converter for converting the data from the one or more devices based on the identified one or more databases for data storage.

* * * * *